Figure 3:
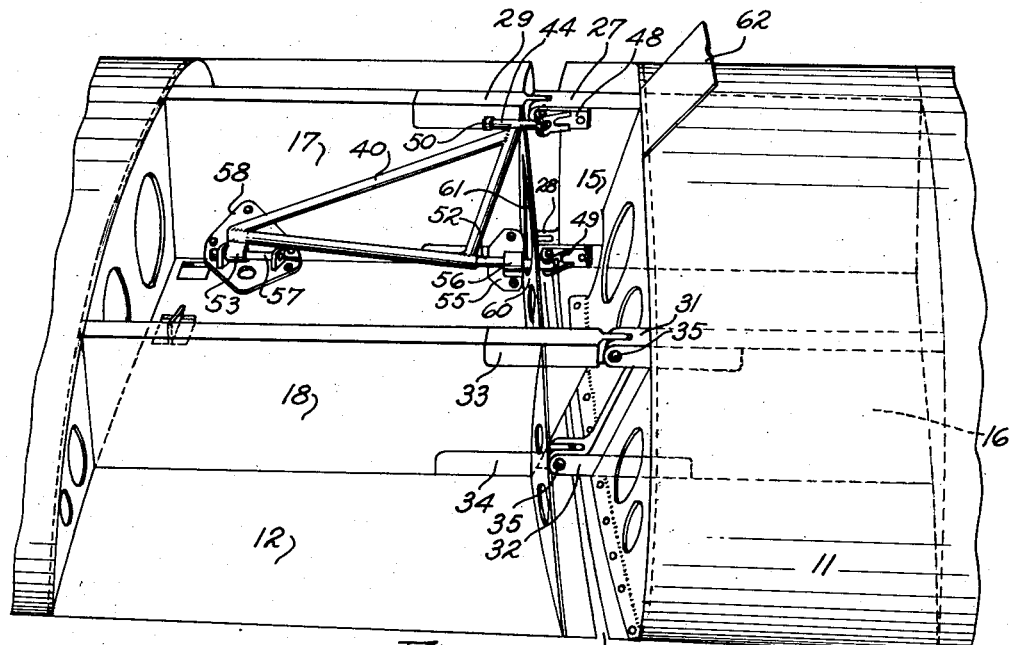

Oct. 23, 1951     E. ABEL, JR     2,572,421
AIRCRAFT FOLDING WING CONSTRUCTION
Filed Sept. 20, 1947     4 Sheets-Sheet 1
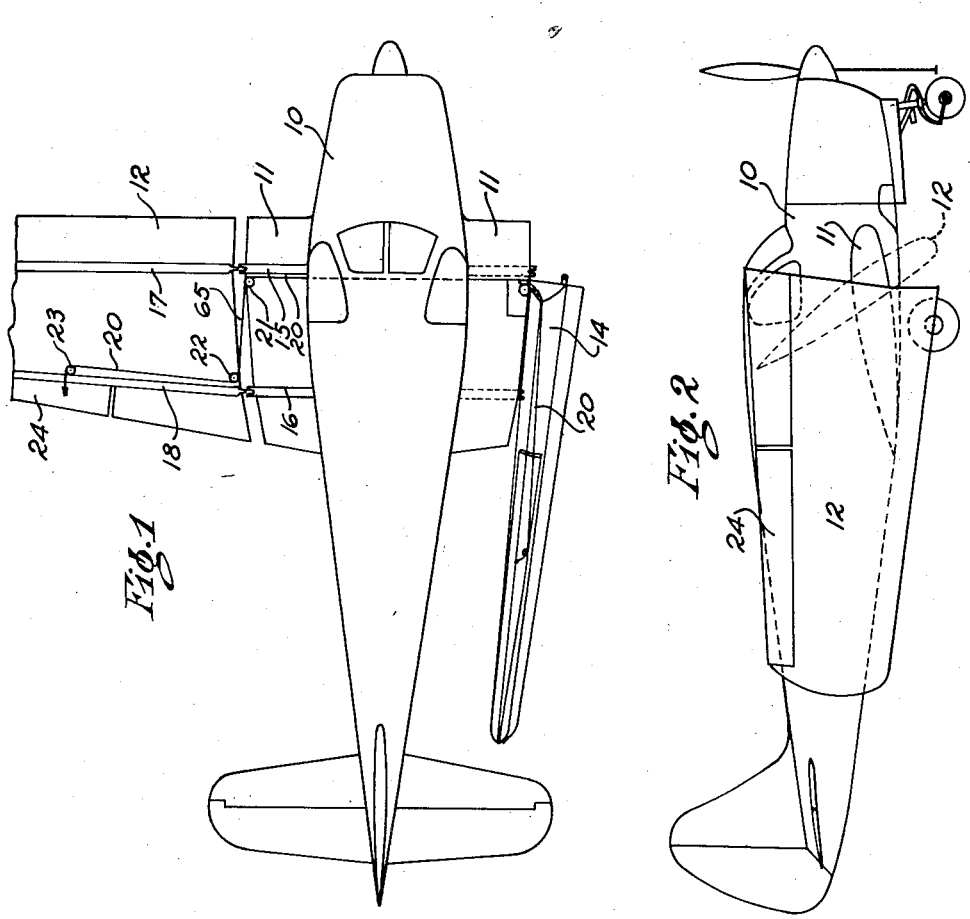
INVENTOR.
EDMUND ABEL, JR.
BY
*Bosworth + Sessions*
ATTORNEYS Oct. 23, 1951        E. ABEL, JR        2,572,421
AIRCRAFT FOLDING WING CONSTRUCTION
Filed Sept. 20, 1947        4 Sheets-Sheet 2

INVENTOR.
EDMUND ABEL, JR.
BY *Bosworth & Sessions*
ATTORNEYS

Oct. 23, 1951      E. ABEL, JR      2,572,421
AIRCRAFT FOLDING WING CONSTRUCTION
Filed Sept. 20, 1947      4 Sheets-Sheet 3
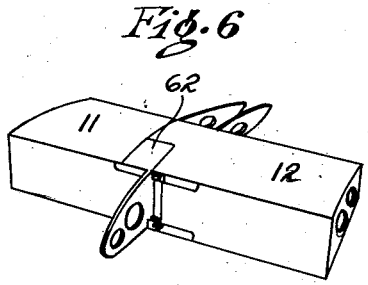
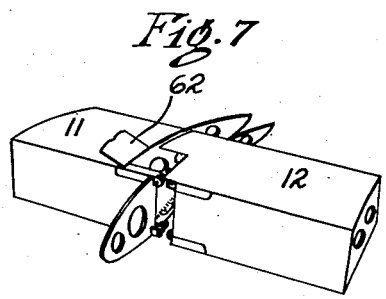
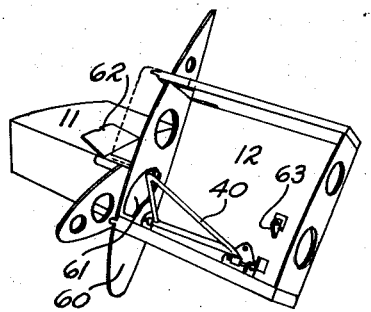
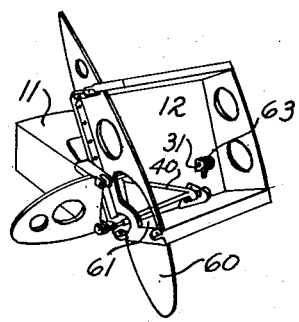
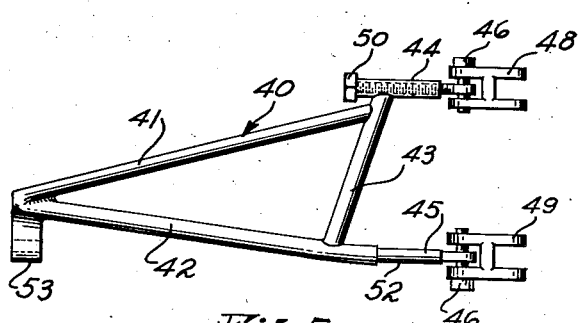
INVENTOR.
EDMUND ABEL, JR.
BY
ATTORNEYS

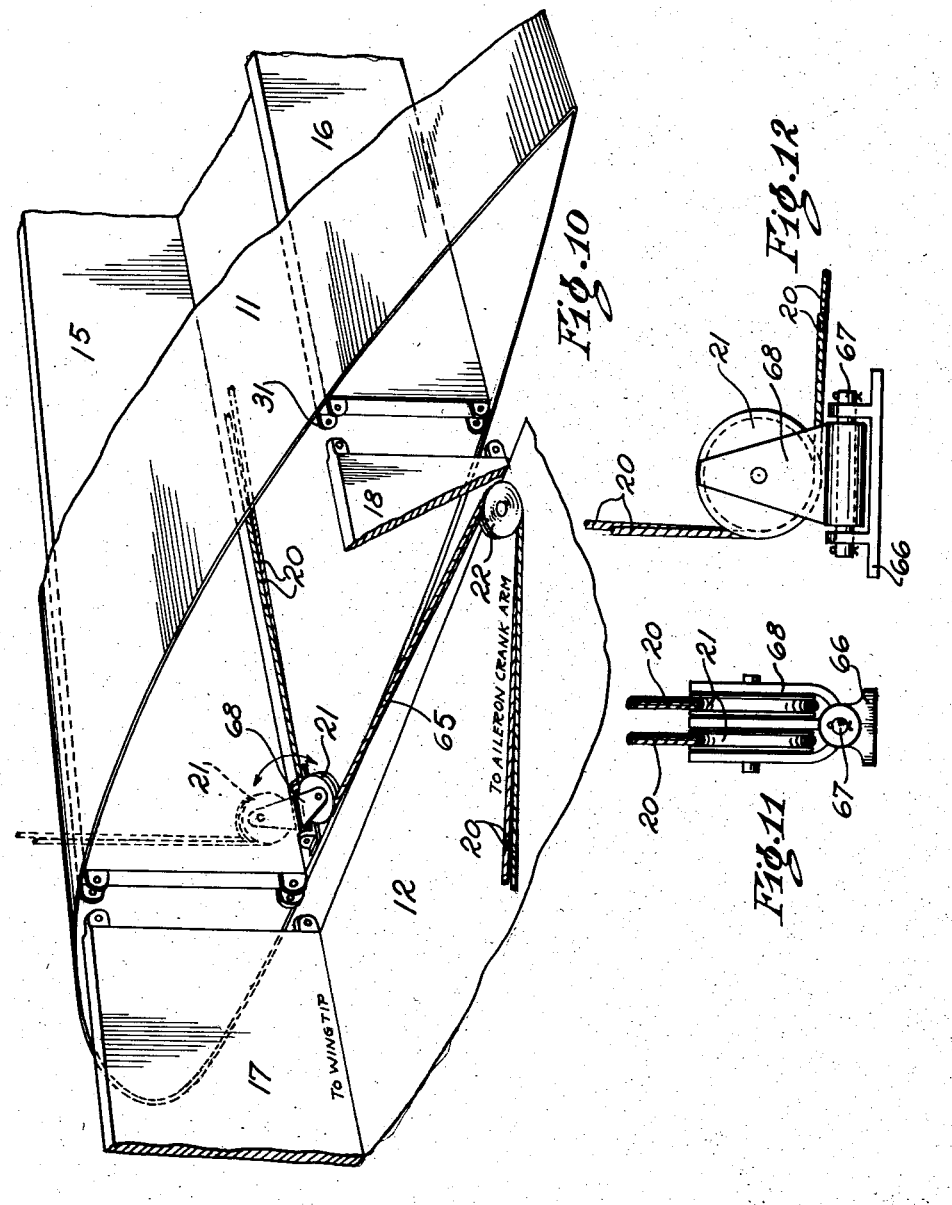

Patented Oct. 23, 1951

2,572,421

UNITED STATES PATENT OFFICE 2,572,421

AIRCRAFT FOLDING WING CONSTRUCTION

Edmund Abel, Jr., Lakewood, Ohio

Application September 20, 1947, Serial No. 775,343

11 Claims. (Cl. 244—49)

This invention relates to folding wing constructions for airplanes and more particularly to a folding wing construction adapted for use in relatively small and light airplanes.

Folding wing devices for aircraft have been known for many years, but the devices which have heretofore come into use, such as the structures used on carrier-based airplanes, are too heavy, complicated and expensive for use on relatively small and light airplanes such as are used for private flying. There is, however, a great demand for a folding wing construction adaptable to light aircraft because of the saving in hangar space which can be realized by the use of folding wings and the increased ease of transporting an airplane with folding wings on the ground.

Accordingly, a general object of the present invention is to provide a light weight and simple folding wing structure for aircraft which can be manufactured and installed in an airplane at reasonable cost. Another object of the invention is to provide a folding wing device for aircraft which does not interfere in any way with the structural parts of the aircraft that are stressed in flight. Another object is the provision of a folding wing device which only supports the wings when the airplane is on the ground and the wings are either folded or in the process of being folded. A further object is the provision of a folding wing construction in which the conventional fittings that support the wings in flight are not subject to any load when the wings are folded. Another object is to provide such a construction in which the supporting mechanism may all be disposed within the wing sections. A further object is to provide a folding wing device in which it is unnecessary to disconnect the control cables when folding the wings. Additional objects and advantages of the invention will become apparent from the following description of a preferred form thereof, reference being made to the accompanying drawings.

In airplanes of conventional design, the center sections of the wings ordinarily consist of short stub wings which project from either side of the fuselage. The outer sections of the wings ordinarily are detachably secured to the center sections by clevises or other similar fittings secured to the wing spars, and the outer sections may be detached by removing the clevis pins or otherwise separating the fittings. The clevises or other fittings are designed to support the wings on the ground and to take the wing stresses while the airplane is in flight.

According to a preferred form of my invention, these more or less standard or conventional wing-fix fittings are not disturbed in any way by the installation of my folding wing construction; thus, the airworthiness of the aircraft is not affected. In its preferred form, my folding wing arrangement comprises a hinge member mounted on the center wing section for pivotal movement about a substantially vertical axis and extending within the outer wing section; when the conventional wing-fix fittings are disconnected, the outer wing section is supported on the hinge member for rotational movement about an axis substantially parallel with the longitudinal axis of the wing and for sliding movement along the same axis. In folding the wings of an airplane embodying my invention, the standard fittings are disconnected by removing the clevis pins or the like; the outer wing section is then supported by the hinge member and is slid outwardly to disengage the standard fittings. Thereafter the outer wing section is rotated about its own axis until it reaches a substantially vertical position, and finally the outer wing section is swung into a position substantially parallel to the fuselage of the airplane, the pivotal mounting of the hinge member on the center wing section permitting this movement.

Figure 4:
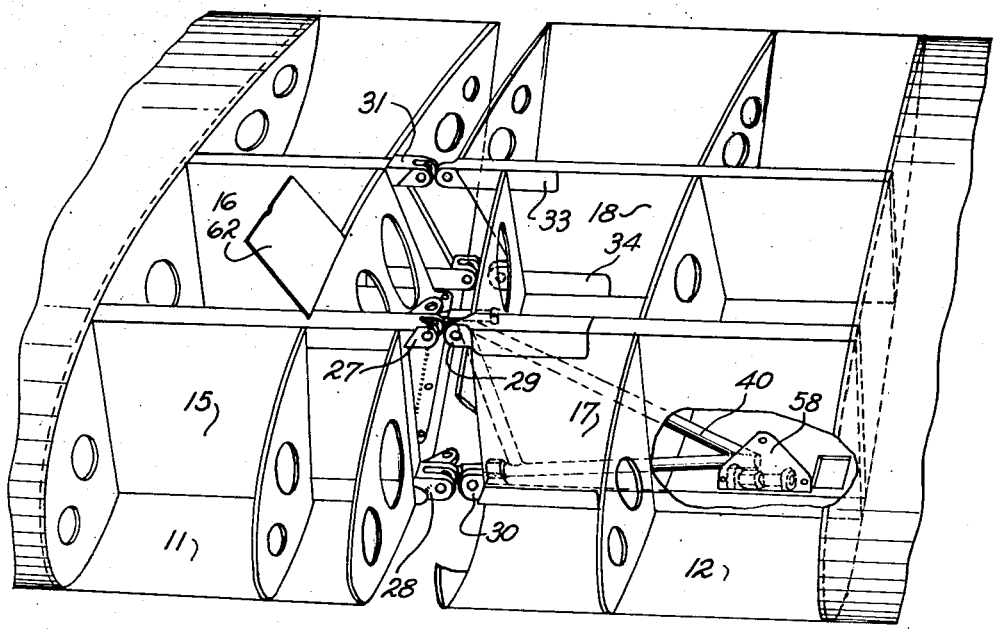

Referring now to the drawings, Figure 1 is a plan view of a light airplane embodying my folding wing construction; Figure 2 is a side elevation of the airplane shown in Figure 1; Figure 3 is a perspective looking from the rear of the inner and outer port wing sections with parts of the covering of the wing removed and showing my construction; Figure 4 is a perspective view looking from the front of the port wing sections with the standard fittings disengaged; Figure 5 is a detail view showing a preferred form of hinge member; Figures 6, 7, 8 and 9 are somewhat diagrammatic perspective illustrations showing the steps in folding a wing embodying my invention; Figure 10 is a perspective view of the port wing sections from the rear, illustrating the manner in which the control cables leading to the aileron may be installed; and Figures 11 and 12 are side and end elevations, respectively, of one of the sheaves for the control cable.

In Figures 1 and 2, my invention is shown as applied to a light airplane of more or less conventional construction having a fuselage 10, port and starboard center wing sections 11, and port and starboard outer wing sections 12. In Figure 1 of the drawings, the upper covering of the wing sections has been removed to show the front and rear spars 15 and 16, respectively, of the inner or center wing sections, and the front and rear spars 17 and 18, respectively, of the outer wing sections. The aileron control lines or cables 20, which pass over sheaves 21, 22 and 23 to the ailerons 24, are also shown. The port wing is shown with the standard wing fittings on the spars 17 and 18 disconnected and the wing moved outwardly preparatory to folding, whereas the starboard wing is shown in folded position. The broken line position of the wing in Figure 2 indicates the intermediate position of the starboard outer wing section 12. Inasmuch as the starboard and port wings are preferably identical except for being of opposite hand, the folding construction of only the port wing will be described herein.

Referring now to Figures 3 and 4 in which the supports for the port outer wing section are shown in greater detail, it will be seen that in flight position, as shown in Figure 3, the outer wing section is supported by conventional wing-fix fittings 27 and 28 on the forward spar 15 of the inner wing section 11, which are engaged by conventional wing-fix fittings 29 and 30 on the forward spar 17 of the outer wing section 12. Similarly, conventional fittings 31 and 32 are provided on the end of the spar 16, and cooperating fittings 33 and 34 are secured to the spar 18. The fittings on the outer wing section are locked to the fittings on the inner wing section by pins 35. Upon removal of these pins 35, the outer wing section is disconnected from the inner wing section and may be moved outwardly with respect thereto to the position shown in Figure 4.

In order to support the outer wing section when the pins 35 have been removed from the conventional spar fittings and to enable the outer wing sections to be folded into a position substantially parallel to the fuselage as shown in Figures 1 and 2, I have provided the hinge member indicated in general at 40 (see Figures 3, 4 and 5). The member 40 comprises a triangular frame made up of tubular members 41, 42 and 43 welded together to provide a light but strong structure. At its inboard end, the triangular hinge member is provided with portions 44 and 45 which have aligned substantially vertical apertures adapted to receive pivot pins 46, which in turn are carried by clevises 48 and 49 secured to the upper and lower portions of the spar 15. Preferably the position of the end of the member 44 may be adjusted by any convenient means such as the screw 50 by which the apertured member 44 is secured to the frame 40. The arrangement thus is such that the frame 40 is mounted for pivotal movement about a substantially vertical axis with respect to the inner wing section 11, but is supported against movement with respect to the inner wing section 11 about any horizontal axis.

Between the apertured end 45 and the connection between members 42 and 43, I preferably provide a substantially cylindrical slide portion 52, while at the outboard end of the member 40 there is secured a hollow sleeve 53, the axis of which substantially coincides with the axis of the slide portion 52.

The slide portion 52 and the sleeve 53 are utilized to support the outer wing section on the hinge member. To this end a fitting 55 is secured adjacent the inboard end of the lower portion of the spur 15, this fitting having a sleeve 56 which slideably engages the slide 52. The sleeve 53 is slidably engaged by a rod 57 supported by a fitting 58 which is secured to the lower portion of the spar 17 at a distance from the inboard end of the spar substantially corresponding to the length of the hinge member 40 between the slide 52 and the sleeve 53. Thus, when the pins 35 are removed from the conventional spar fittings, the weight of the outboard wing section 12 is supported by the hinge member 40, and the outboard wing section may be moved outwardly from the position shown in Figure 3 to the position shown in Figure 4 with the sleeve 56 sliding on the slide 52 and the sleeve 53 sliding on the member 57.

When the parts are in the position shown in Figure 2, the outboard wing section may then be rotated about the common axis of the slide 52 and the sleeve 53, the innermost rib 60 of the outer wing section being provided with an arcuate slot 61 (see Figures 3, 8 and 9) in order to permit this rotation without interference with the member 44 of the hinge member 40. Thereafter, the wing may be swung bodily about the pivot established by the pivotal mounting of the hinge on the inner wing section.

The sequence of operations is illustrated diagrammatically in Figures 6 to 9, inclusive. In Figure 6, the wing sections 11 and 12 are shown in their normal flight position. In Figure 7 the flap 62 has been opened to make the conventional fittings accessible, the pins 35 have been removed and the outer wing section 12 has been slid outwardly while supported by the hinge member 40. In Figure 8, the outer wing section 12 has been rotated to lower the leading edge of the wing and raise the trailing edge; and in Figure 9 the wing has been swung back into a position substantially parallel with the fuselage of the airplane as shown in Figures 1 and 2.

It will be noted that the fittings 31 and 32 on the rear spar are closer to the center line of the airplane than the fittings 27 and 28 on the front spar of the center section and that the parting lines between the inner and outer sections on opposite sides of the fuselage converge toward the rear of the airplane. This permits the outer wing section to be folded to a position substantially parallel to the fuselage without interference between the wing sections. It is also to be noted that, if desired, an opening may be provided in the lower covering of the outer wing section 12, and a fitting 63 secured to the wing adjacent the opening and in such position that when the wing section is in folded position as in Figure 9, the fitting 31 projects through the opening and may be engaged by and locked to the fitting 63 in order to secure the wing in folded position.

With my construction, it is unnecessary to disconnect the control cables when the wings are folded. It will be observed that as shown in Figure 1, the reach 65 of the cable 20 between the sheaves 21 and 22 is substantially normal to the immediately adjacent reaches of the cable and to the wing spars when the outer wing section has been moved outwardly into the position shown in Figures 1, 4 and 10. Thus, when the wing section is moved inwardly into its normal flight position, the reach 65 will make acute angles with adjacent reaches of the cable, and the distance between sheaves 21 and 22 will be increased. Accordingly if the control cables are adjusted to the proper tension when the wings are in flying position, they will be slackened slightly when the outer wing sections are moved outwardly preparatory to folding. The cable is slackened because, when the wings are in flight position, the point of tangency of the reach 65 of the cable and the sheave 22 on the outer wing section lies on the inboard side of a line drawn perpendicular to the direction of sliding movement of the outer wing section and through the point of tangency of the reach 65 of the cable with the sheave 21 on the inner wing section, whereby when the outer wing section is slid outwardly preparatory to folding, the distance between the two sheaves is decreased. It is also contemplated that hydraulic control lines disposed in a similar manner may be employed.

Thus, the folding operation does not put any strain on the control cables and may be carried out simply by providing the sheave 21 with a pivotal mounting as shown in Figures 11 and 12, the mounting preferably comprising a base 66 supporting a pin 67 on which the supporting frame 68 of the sheave 21 is pivoted. When the wing is rotated about its axis, the sheave 21 takes the position shown in broken lines in Figure 10, and the only effect on the cable of the entire folding operation is to twist the cable slightly about its own axis. Thus, the folding wind construction introduces no complications in the controls, and the folding operation can be carried out without disconnecting or adjusting the controls in any way.

As noted above, the structural arrangements of the wings may be conventional in every way as the folding mechanism requires no changes in those portions of the wing that are stressed in flight. The lower coverings of the wing sections 11 and 12 are disposed close to each other when the wings are in flying position and, if desired, the small gap 70 (Figure 3) between them may be closed by a rubber sealing member. Similarly, the gap between the upper covering of the wing sections may also be closed by a sealing member. Access openings may be provided in the wings in the conventional manner.

From the foregoing description of a preferred form of my invention, it will be seen that I have provided a simple and light folding wing construction for aircraft in which the wing is supported in folded position by parts which are not stressed when the airplane is in flight, and in which the usual connections between the wing sections are disconnected and remain unstressed when the wings are folded. Thus, the addition of my folding wing construction to an airplane requires no substantial changes in the design of the aircraft, and as the folding wing supports are not stressed while the aircraft is in flight, they may be made of light weight. With my arrangement, the controls are not affected, the folding operation can be carried out very rapidly, and when the wings are folded, the storage space required by the airplane is reduced by about two-thirds.

Those skilled in the art will appreciate that my construction can be adapted to aircraft of various types, and that various changes and modifications may be made in the preferred form of the invention illustrated herein without departing from the spirit and scope of the invention. Accordingly, it is to be understood that my patent is not limited to the embodiment described herein or in any manner other than by the scope of the appended claims.

I claim:

1. A folding wing construction for an airplane having a center wing section and an outer wing section and disconnectable means securing the outer wing section to the center wing section under flight conditions, said folding wing construction being separate from said disconnectable supporting means and comprising a hinge member mounted on the airplane and adapted to support said outer wing section when said disconnectable means are disconnected, said hinge member having slide means thereon, said outer wing section having slide means cooperating with the slide means on said hinge member for pivotally and slidingly connecting said outer wing section to said hinge member, the axis of the slide means being disposed substantially parallel to the longitudinal axis of said outer wing section, the slide means on said outer wing section and on said hinge member being rotatable relative to each other about said axis when said disconnectable means are disconnected, and means for pivotally connecting said hinge member to said center wing section whereby to permit said outer wing section to be swung bodily relative to said center wing section about a vertical axis into a position lying generally parallel to the longitudinal axis of said airplane.

2. A folding wing construction according to claim 1 wherein the hinge member constitutes a triangular member extending within the outer wing section with said axis of the slide means adjacent the lower surface of said outer wing section.

3. A folding wing construction according to claim 2 wherein means are provided for locking the outer wing section in folded position.

4. A folding wing construction according to claim 3 wherein the locking means comprises means engageable with one of said disconnectable means when said outer wing section is in folded position.

5. A folding wing construction for an airplane having a center wing section, an outer wing section and disconnectable means for securing the outer wing section to the center wing section under flight conditions, said disconnectable securing means having parts on said center and outer wing sections which are disengageable upon movement of the outer wing section outwardly away from said center wing section; said folding wing construction being separate from said disconnectable securing means and comprising a hinge member having sleeve and slide member connection means engaging said outer wing section to support same for sliding movement along an axis substantially parallel with the said outer wing section and for rotational movement about said axis, said hinge member also having clevis means pivotally carried thereby and secured to said center section to support said hinge member for pivotal movement about a vertical axis whereby, when said disconnectable securing means are disconnected, said outer wing section may be first slid outwardly to disengage the parts of said disconnectable securing means, and whereby said outer wing section thereafter may be rotated about said axis to place it in a substantially vertical position supported by said hinge member, and then said outer wing section may be swung bodily into a position substantially parallel with the longitudinal axis of the airplane, said hinge member pivoting about said vertical axis.

6. A folding wing construction according to claim 5 wherein a control cable extends from the center wing section to the outer wing section, said cable having a portion extending generally transversely of said wing sections adjacent the zone of connection of said wing sections between a sheave disposed on said center wing section and a sheave disposed on said outer wing section, the point of tangency of said portion of the cable and the sheave on the outer wing section lying on the inboard side of a line perpendicular to the direction of sliding movement of the outer wing section and through the point of tagency of said portion of the cable and the sheave on said center wing section, whereby when the distance between the two sheaves is decreased and the tension on the cable reduced when the outer wing section is slid outwardly preparatory to folding.

7. A folding wing construction according to claim 6 wherein said sheave on the center wing section is pivotally mounted on an axis substantially aligned with the axis of rotation of the outer wing section on said hinge member.

8. A folding wing construction according to claim 5 wherein the parting lines between the center and outer wing sections on opposite sides of the airplane converge toward the rear of the airplane.

9. A folding wing construction for an airplane having a center wing section and an outer wing section and disconnectable means securing the center wing section to the outer wing section under flight conditions, comprising a triangular shaped hinge member disposed to extend longitudinally of and within said outer wing section and having one end thereof adjacent the parting line between said center and outer wing sections, spaced hinge portions integral with said hinge member projecting from said one end thereof and having vertically aligned apertures therein, clevis means secured to said center wing section, said hinge portions being pivotally connected to said clevis means whereby to permit rotation of said hinge about the axis of said vertically aligned apertures, a slide portion on said hinge member at said one end thereof, a hollow sleeve member at the other end of said hinge member, the axes of said slide portion and said sleeve member being aligned, and means secured to said outer wing section and engageable with said slide portion and said sleeve for supporting said outer wing section for rotational movement about and longitudinal movement along the axes of said sleeve and said slide portion.

10. A folding wing construction for an airplane having a wing section and disconnectable means for supporting said wing section under flight conditions and in normal flying position, said folding wing construction being separate from said disconnectable supporting means and comprising a hinge member having a sleeve and slide member, a sleeve and slide member on said wing section, said slide members being slidable relative to and within said sleeves in a direction substantially parallel to the longitudinal axis of said wing section between an inner position and an outer position, said detachable supporting means being engaged when said sleeves are positioned at said inner position and being disengaged when said sleeves are positioned at said outer position, said wing being rotatable about said longitudinal axis when said sleeve is positioned at said outer position, and clevis means on said airplane for pivotally connecting said hinge member to said airplane whereby to permit said wing section to be swung bodily about a substantially vertical axis into a position lying generally parallel to the longitudinal axis of the airplane.

11. A folding wing construction according to claim 10 wherein a control line extends to the wing section in such manner that the control line is slackened when said wing section is slid outwardly on said hinge member.

EDMUND ABEL, Jr.

REFERENCES CITED

The following references are of record in the file of this patent:

UNITED STATES PATENTS

| Number | Name | Date |
|---|---|---|
| 1,793,056 | Carns | Feb. 17, 1931 |

FOREIGN PATENTS

| Number | Country | Date |
|---|---|---|
| 481,050 | Great Britain | Mar. 4, 1938 |
| 490,151 | Great Britain | Aug. 10, 1938 |